Sept. 23, 1924.  1,509,407
A. E. MacQUARRIE
MAP HOLDER
Filed March 24, 1923
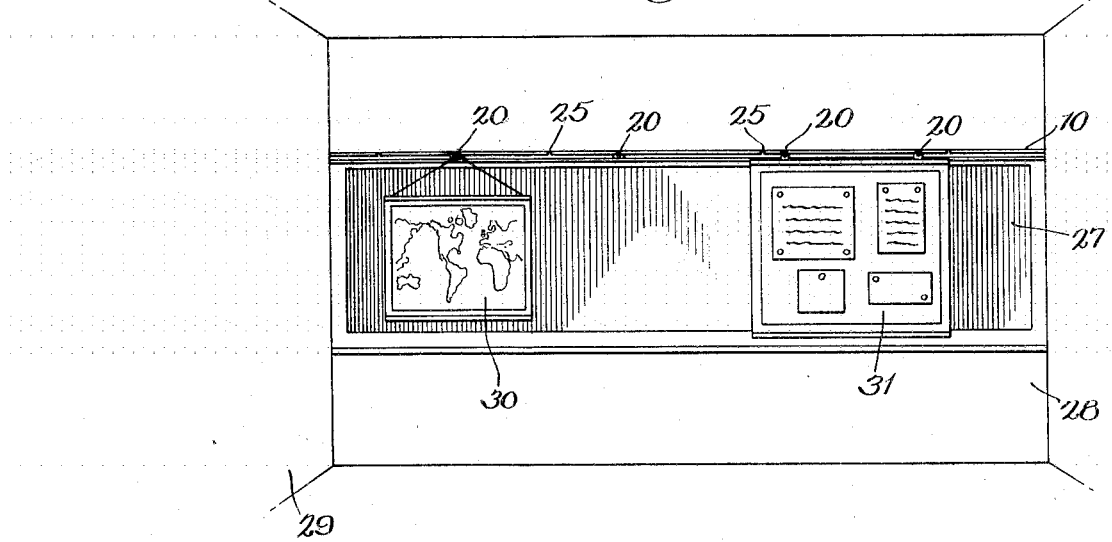
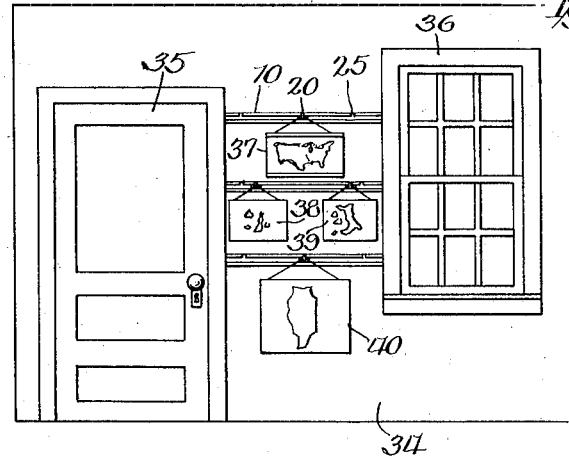
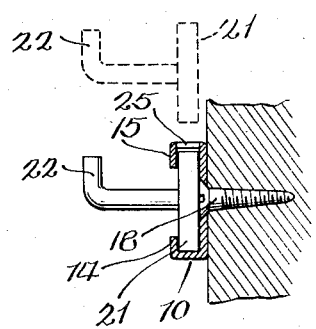
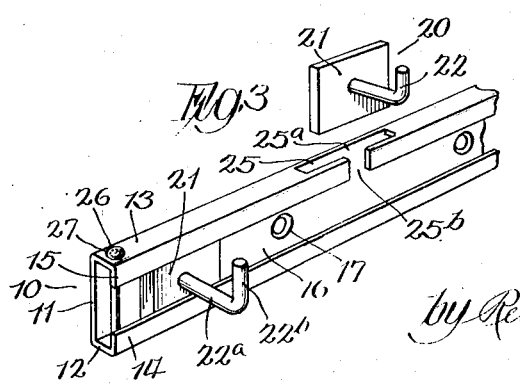
Inventor:
Archibald E. MacQuarrie
by Rector, Hibben, Davis & Macauley
atty's.

Patented Sept. 23, 1924.

1,509,407

UNITED STATES PATENT OFFICE.

ARCHIBALD E. MacQUARRIE, OF MINNEAPOLIS, MINNESOTA.

MAP HOLDER.

Application filed March 24, 1923. Serial No. 627,527.

*To all whom it may concern:*

Be it known that I, ARCHIBALD E. MAC-QUARRIE, a citizen of the United States, residing at Minneapolis, in the county of Hennepin and State of Minnesota, have invented certain new and useful Improvements in Map Holders, of which the following is a specification.

This invention relates to improvements in map holders and its purpose is to provide a device intended primarily for use in school rooms to hold maps in convenient positions for the instruction of the pupils. The invention is intended to fulfill a long existing demand for a device capable of being supported on the wall of a schoolroom and adapted to permit the attachment thereto of maps in a plurality of different positions so that the maps may be adjusted from place to place and arranged in a desired order or grouping. One object of the invention is to provide a map holder which may be readily secured in place on the wall, above the blackboard for example, and comprising a plurality of map supporting attachments which may be adjusted longitudinally thereof to support the maps at various places over the face of the blackboard. Another object is to provide a slotted supporting bar in combination with a plurality of map supporting attachments which may be readily placed in position in the bar and which may be adjusted longitudinally thereof to support maps in any desired locations. Still another object is to provide a slotted bar having notches in the upper part thereof to permit map supporting attachments to be passed into engagement with the slot of the bar without interfering with other attachments located at other places along the bar. A further object is to provide a map holding device which may be conveniently and economically manufactured and readily mounted in place for the convenient use of the instructor in the schoolroom. Other objects relate to various features of construction and arrangement which will appear more fully hereinafter.

The nature of the invention will be understood from the following specification taken with the accompanying drawings in which one embodiment is illustrated. In the drawings, Fig. 1 shows a view of one wall of a schoolroom illustrating the improved map holding device of the present invention mounted along the upper edge of a blackboard and having maps suspended therefrom; Fig. 2 shows a view of another wall of a schoolroom illustrating another arrangement of the map holding device for supporting a plurality of small maps in a group; Fig. 3 is a perspective view of a section of the map holding device illustrating particularly the method of inserting the map holding attachments in the slotted bar from the upper side thereof; and Fig. 4 shows a sectional view through the slotted bar of the map holding device taken perpendicularly to the supporting wall, and illustrating by dotted lines the method of inserting the map supporting attachments from the top.

As illustrated in the drawings, the invention comprises a longitudinal bar 10 having a rear wall 11, a bottom wall 12, a top wall 13 and front flanges 14 and 15 which are formed integrally with the walls 12 and 13, respectively, and arranged to extend parallel to the rear wall 11 with a longitudinal slot 16 between them. The rear wall 11 of the bar 10 is provided at intervals with apertures 17 adapted to be engaged by screws 18 which secure the bar to the supporting wall, with its larger cross-sectional dimension extending vertically, the apertures 17 being of such form that the heads of the screws 18 lie flush with, or inwardly from, the outer surface of the rear wall 11. The bar 10 and the parts thereof are formed as one integral construction and may preferably be of rolled metal or by stamping sheet metal of the proper thickness.

The slotted bar 10 is adapted to be engaged by any desired member to map holding attachments 20 each of which comprises a rectangular plate 21 with a hook 22 projecting outwardly from the central part thereof. The hook 22 is formed integrally with the plate 21 or rigidly secured thereto and it preferably comprises a part 22ª extending normally to the plate 21 with another part 22ᵇ extending vertically upward from its outer end. The plates 21 of the map supporting attachments are adapted to engage, and slide longitudinally in, the under-cut groove of the member 10 and the proportions of the plate 21 are such that it substantially fills the space between the rear wall 11 and the front flanges 14 and 15 and also the space measured vertically between the bottom wall 12 and the top wall 13, enough clearance being provided to permit the ready sliding movement of the attachments 20 longitudinally of the bar 10 while preventing the tilting of the plates 21 to any material extent in any direction.

Where either end of the bar 10 is accessible, the plates 21 may be passed into engagement with the under-cut groove of the bar from the end thereof, with the hooks 22 extending outwardly through the slot 16 between the front flanges, but where the ends of the bar 10 terminate in proximity to either the walls of the room or to the casings of doors or windows, it may be desirable to insert the devices 20 at points between the ends of the bar, and the occasion for inserting the devices 20 in the slotted bar at points between the ends thereof may also arise when the instructor wishes to place a map between two other maps which have previously been put in place on members 20 supported by the bar. The bar 10 has therefore been provided with a plurality of T-shaped notches 25 which are formed through the top wall 13 and the front flange 15, each notch comprising a rectangular portion 25ª formed through the top wall 13 and a neck or stem 25ᵇ which extends through the depending flange 15. The notches 25 are of sufficient size to receive the plates 21 and the hooks 22 of the map supporting attachments 20 which may be dropped in Figs. 3 and 4, after which the attachments 20 may be shifted longitudinally in the bar to the desired locations. In case either end of the bar 10 terminate on the wall of the room away from the adjacent side wall or the casing of a door or window, the accidental removal of any of the attachments 20 from the under-cut groove of the bar may be prevented by inserting a pin 26 downwardly through apertures 27 which are formed in the walls 12 and 13 at the end of the bar, as shown in Fig. 3.

One method of using the map holder is illustrated in Fig. 1 where the bar 10 is shown mounted horizontally along the top edge of a blackboard 27 which is located on a wall 28 of a schoolroom. A plurality of the map supporting devices 20 are distributed along the bar 10, which terminates at its ends in close proximity to the side walls 29 of the room, and these attachments are employed for supporting the map 30 and the bulletin board 31. The map 30 is suspended from a single attachment 20 while the bulletin board 31 is supported on two separate attachments 20 which have been adjusted longitudinally to permit the hooks 22 thereof to be brought into engagement with the supporting loops of the board or frame. Either the map or the board may be shifted longitudinally over the blackboard and other maps may be readily supported on the same bar 10 by inserting other attachments 20 through the slots 25 in the upper part of the bar.

In Fig. 2 of the drawings, there is illustrated another use of the invention, according to which a number of bars 10 are mounted in horizontal positions on a wall 34 with their ends terminating in proximity to the casings of a door 35 and a window 36. The ends of the slotted bars are thus closed by the casings so that the map supporting attachments 20 must be inserted or withdrawn from the bars through the slots 25 in the upper parts thereof. The three bars 10 are spaced apart vertically between the window and the door and are adapted to support a plurality of maps 37, 38, 39 and 40 which are thus conveniently supported in a group so that reference may readily be had to any one of them. Various other arrangements of the map holding devices may of course be made to suit the convenience of the instructor and his pupils.

Although one form of the invention has been shown and described for purposes of illustration, it will be understood that the invention may be embodied in various other forms without departing from the scope of the appended claim. The combinations of the map holding or display device with the blackboard and the wall of the room are claimed in my co-pending application Serial No. 731,238, filed August 11, 1924.

I claim:

A supporting device comprising a bar having a vertical rear wall, outwardly extending top and bottom walls, and vertical flanges extending downwardly and upwardly from said top and bottom walls respectively with a longitudinal slot between them, and a supporting attachment comprising a plate movable longitudinally of said bar between said rear wall and said flanges and between said top and bottom walls and having a hook projecting outwardly through said slot, said top wall having an opening therein to permit said plate to be brought into operative engagement with said bar and said flange extending downwardly from said top wall being provided with a notch forming a communication between said opening and said slot to permit the passage of said hook, said notch having a lesser dimension longitudinally of said bar than said plate.

ARCHIBALD E. MacQUARRIE.